(12) United States Patent
Zhang et al.

(10) Patent No.: US 9,793,744 B2
(45) Date of Patent: Oct. 17, 2017

(54) INTERFACE AND MOUNTING STRUCTURE FOR A WIRELESS CHARGER OR INTERMEDIATE PIECE

(71) Applicants: Yizhuo Zhang, Arlingtong Heights, IL (US); Marco Laubach, Wheeling, IL (US); Steve Cole, Lombard, IL (US)

(72) Inventors: Yizhuo Zhang, Arlingtong Heights, IL (US); Marco Laubach, Wheeling, IL (US); Steve Cole, Lombard, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 33 days.

(21) Appl. No.: 14/851,314

(22) Filed: Sep. 11, 2015

(65) Prior Publication Data

US 2016/0079801 A1  Mar. 17, 2016

Related U.S. Application Data

(60) Provisional application No. 62/049,458, filed on Sep. 12, 2014.

(51) Int. Cl.
*H02J 7/00* (2006.01)
*H02J 7/02* (2016.01)
*H02J 50/10* (2016.01)

(52) U.S. Cl.
CPC ............ *H02J 7/025* (2013.01); *H02J 7/0044* (2013.01); *H02J 7/0045* (2013.01); *H02J 50/10* (2016.02)

(58) Field of Classification Search
CPC .......... H02J 7/025; H02J 5/005; H02J 7/0052; H02J 50/10; H02J 50/90; H02J 50/12
(Continued)

(56) References Cited

U.S. PATENT DOCUMENTS 2,860,929 A   11/1958   Gussack
5,144,217 A   9/1992    Gardner et al.
(Continued)

FOREIGN PATENT DOCUMENTS

WO  2014096037 A2  6/2014
WO  2014096048 A2  6/2014
WO  2014096052 A2  6/2014

OTHER PUBLICATIONS

International Search Report and Written Opinion corresponding to PCT Application No. PCT/US2015/049651, dated Dec. 23, 2015 (13 pages).

*Primary Examiner* — Nghia Doan
(74) *Attorney, Agent, or Firm* — Maginot Moore & Beck LLP (57) ABSTRACT

A wireless charging system for power tools and other devices includes a charging module, docking frame, and tool holder. When a device is placed on a charging surface of the charging module, the charging module is configured to wirelessly charge the device. The charging module can be mounted within the docking frame or the tool holder via a mounting interface, and the tool holder can be affixed to a rigid surface. The docking frame can also be attached to a rigid surface, or can be mounted within the tool holder as an intermediate piece. The tool holder is configured to support the charging module such that the charging surface is at an angle. This configuration optimally locates the device relative to the charging module and allows the charging surface to act as a resting surface for the device between operations.

17 Claims, 6 Drawing Sheets

(58) Field of Classification Search
USPC .......................................... 320/108, 112–115
See application file for complete search history.

(56) References Cited

U.S. PATENT DOCUMENTS

| | | | |
|---|---|---|---|
| 5,959,433 A | 9/1999 | Rohde | |
| 8,482,160 B2 | 7/2013 | Johnson et al. | |
| 9,436,220 B2* | 9/2016 | Rosenberg | G06F 1/1632 |
| 2009/0177908 A1 | 7/2009 | Baarman et al. | |
| 2010/0312938 A1* | 12/2010 | Stampfli | A45F 5/00 |
| | | | 710/304 |
| 2013/0219098 A1* | 8/2013 | Turnpenny | H04M 1/04 |
| | | | 710/303 |
| 2014/0106829 A1 | 4/2014 | Hong et al. | |
| 2014/0143933 A1 | 5/2014 | Low et al. | |
| 2014/0232331 A1 | 8/2014 | Stamenic et al. | |
| 2016/0064987 A1* | 3/2016 | Sheu | H02J 7/0042 |
| | | | 320/108 |

* cited by examiner

INTERFACE AND MOUNTING STRUCTURE FOR A WIRELESS CHARGER OR INTERMEDIATE PIECE

RELATED APPLICATION

This Application claims priority to U.S. Provisional Application No. 62/049,458 filed on Sep. 12, 2014, entitled "Interface and Mounting Structure for a Wireless Charger or Intermediate Piece," the disclosure of which is incorporated by reference herein in its entirety. Where a definition or use of a term in a reference is inconsistent or contrary to the definition of that term provided herein, the definition of that term provided herein applies and the definition of that term in the reference does not apply.

TECHNICAL FIELD

This disclosure relates generally to wireless chargers, and, more particularly, to interfaces between wireless chargers and structures.

BACKGROUND

A common problem associated with the use of electronic devices and tools is the necessity of powering such electronic devices. Power cords connected to an external power source provide sufficient power, but are an obtrusive and problematic interference, especially with regard to power tools which are desirably easily manipulated in and around workspaces that are often crowded and obstructed, or which are desirably transported between different job sites.

Rechargeable cordless tools are a common alternative. Such systems typically include a removable rechargeable battery and a charging station. When depleted, a rechargeable battery can be removed from the tool and inserted into the charging station for charging. U.S. Pat. No. 5,144, 217 describes a cordless tool battery housing and charging system that accommodates a variety of sizes and power charges of different batteries via a controlled wired charging process. Such technologies typically require not only removal of the battery from the tool in order to initiate charging, but also require a wired contact connection between the battery and charging station, which may be susceptible to damage due to, for example, moisture, dirt, or physical damage that prevents the battery from optimally coupling with the charging station.

Technology has been developed in an effort to alleviate these concerns via inductive or wireless charging. U.S. Pat. No. 8,482,160 describes a system whereby a plurality of wireless charging modules are placed underneath a workspace in order to inductively charge a secondary tool placed on the workspace in a region of one of the modules. However, such a system is expensive and complex to install, only enables wireless charging at the fixed regions of the modules, does not ensure that a tool is optimally located within a charging region for optimal charging, and is inapplicable to mobile applications. Further, such a system does not provide protection against a tool being unintentionally jostled and relocated during charging. For instance, a user might place a tool near a charging module with the expectation that the tool will charge. The user might then continue work with another device or tool, and in so doing, unintentionally move the tool away from the module, such that when the user again wishes to use the tool, it has not been charged as desired. Other conventional wireless chargers resemble pads, and are similarly unsecured.

Other types of wireless charging devices have also been developed for charging tools and other devices, and typically resemble a pad on which a device is rested to initiate charging. However, such chargers present undesirable use cases when used as a tool resting surface since they are not secured to a supporting surface, nor do they secure the tool itself from unintended motion or vibration.

In one such undesirable use case, a user is operating a power drill powered by a rechargeable battery. When the battery becomes depleted, the drill becomes inoperable. In order to resume work, the user can, for example, replace the depleted battery with a charged replacement battery, or place the battery and/or tool onto a charging station and wait for the battery to recharge. Replacing the battery requires the user to obtain, store, and maintain charging for multiple batteries, which increases the expense and complexity of operating the drill, and waiting for the battery to recharge can necessitate delays in workflow before the user can resume drilling.

Additionally, conventional wireless charging stations do not guide an optimal location of the battery/tool for optimized charging, and do not secure the battery/tool in place. As a result, the battery/tool that is not optimally placed on a wireless charging station may charge slower or may fail to completely charge. Even if optimally placed, the battery/tool may become dislodged or moved due to inadvertent contact from the user, another tool or object, or other external forces such as vibrations from machinery. In another example, a charging station is positioned in a vehicle, and a battery/tool is placed thereon for charging. During transport, motion from the vehicle can jostle the battery/tool out of position and hinder or prevent charging. These types of impacts, jostling, and vibrations can also result in damage to the battery/tool when the battery/tool is unsecured.

Therefore, what is needed is a way of charging a battery of a tool without interrupting its use or obstructing a workspace with cords or a charging station in such a way that optimally positions the tool for charging and protects against unintentional interruption of charging of the tool.

SUMMARY

The following is a brief summary of subject matter described in greater detail herein. This summary is not intended to be limiting as to the scope of this disclosure or to the claims.

A wireless charging module for a wireless charging system includes a charging surface. When a device is placed on the charging surface, the charging module is configured to wirelessly charge the device.

A docking frame can be used to support the charging module and/or the device. The charging module further includes a mounting interface that can be received by a receiving interface of the docking frame in order to mount the charging module within the docking frame. The docking frame can also include a guiding structure to guide the device into an optimal location on the charging surface for wireless charging. A bottom surface of the docking frame can be affixed to a rigid surface in order to provide a fixed support for the device. The docking frame can also be mounted within a tool holder, whereby a further mounting interface of the docking frame is configured to be received by a further receiving interface of the tool holder. The charging module can also be directly mounted within the tool holder.

The tool holder has a base surface, a receiving portion that includes the further receiving interface, and a tool holding portion. In addition to being configured to receive the docking frame, the further receiving interface can also be configured to directly receive the charging module. The further receiving interface is oriented at an angle relative to the base surface. This configuration allows the docking frame and/or charging module to by urged by gravity into the receiving portion of the tool holder, and causes the charging surface of the charging module to be oriented at said angle relative to the base surface. The base surface can be affixed to a rigid and substantially horizontal surface, and a side of the tool holder can be affixed to a rigid and substantially vertical surface. The tool holding portion is configured to at least partially support a device disposed on the charging surface, and is positioned to allow the device to be urged by gravity into the tool holder portion due to the angled orientation of the charging surface of the charging module.

The above presents a simplified summary of this disclosure in order to provide a basic understanding of some aspects of the technologies disclosed herein, and is not an extensive or complete overview of such topics. As such, the summary above does not delineate the scope of this disclosure, and is not intended to identify key or critical aspects of the disclosure. Further details are provided by the detailed description, the claims, and the drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
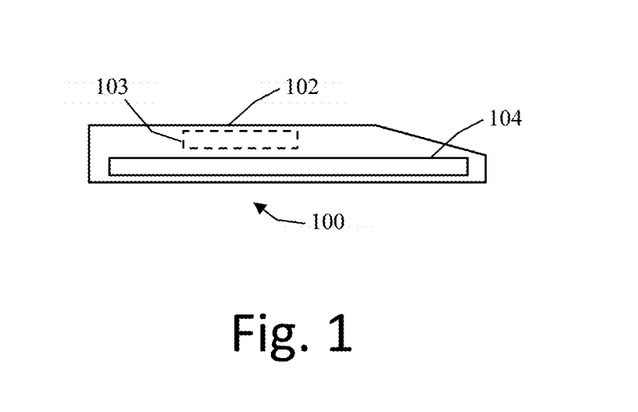
FIG. 1 is a side view of a wireless charging module according to this disclosure.
Figure 2:
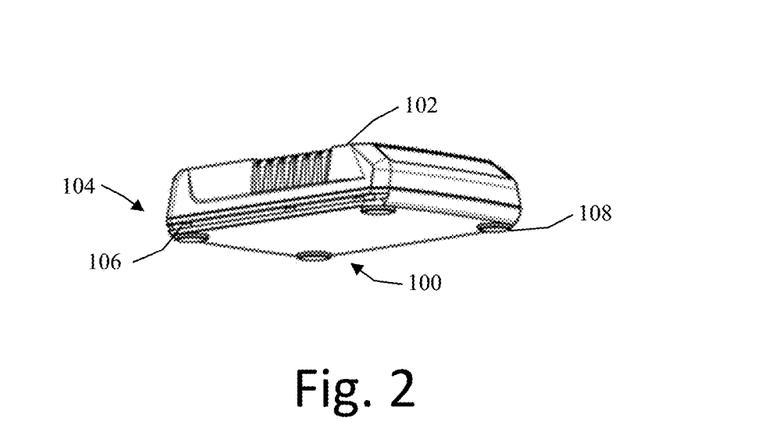
FIG. 2 is a perspective view of the wireless charging module of FIG. 1.

FIG. 1 depicts a side view and FIG. 2 illustrates a perspective view of a wireless charging module 100 according to this disclosure. The wireless charging module 100 defines a charging surface 102, and includes an induction charging coil 103, a mounting interface 104, and a plurality of feet 108.

The charging surface 102 is formed by a top surface of the charging module. The induction charging coil 103 is disposed within the charging module 100, and is configured to inductively charge a rechargeable battery placed on or near a charging surface 102. Acceptable wireless inductive battery charging devices are described in U.S. Pat. No. 5,959,433, WO2014/096052, WO2014/096037, and WO2014/096048. Other types of conventional inductive charging systems are also contemplated. For example, the wireless charging module 100 supports Q1 inductive charging, or the like.

The mounting interface 104 is disposed on the lateral sides of the charging module 100, and is configured to removably mount the charging module 100 within another structure, such as a docking frame or tool holder as discussed below, to enable rigid support of the charging module 100 on a surface, wall, tool box, vehicle, cart, work surface, or the like. As illustrated in FIG. 2, in this embodiment the mounting interface 104 includes a rail 106 configured to removably mate with a receiving interface of the other structure. In other embodiments, the mounting interface 104 can include one or more of, for example, a rail, a snap structure, a roller, or other removable mounting structures.

The plurality of feet 108 are disposed on a bottom of the charging module 100 opposite the charging surface 102, and are configured to provide at least partial damping and/or restraint against motion. For example, the plurality of feet 108 can provide at least partial damping relative to the other structure housing the charging module 100, or can provide at least partial damping when the charging module 100 is not mounted in another structure and is resting directly on an unsecured surface. The feet 108 can include rubber footing, grips, or other structure configured to arrest motion or provide damping. In another embodiment, the mounting interface 104 includes a damping material configured to provide at least partial damping between the charging module 100 and the other structure.

The charging module 100 can be used to charge a removable battery that is not connected to a tool and is placed on the charging surface 102, or can be used to charge a battery configured to remain within a tool during charging. In some cases, a battery within a tool may be spaced apart from a bottom surface of the tool. Thus, the optimal position for a battery for wireless charging via the induction charging coil 103 may be on or near the charging surface 102, or at a distance spaced apart from the charging surface 102. In an embodiment, the charging module 100 is configured to adjust the optimal charging location based on the tool or device placed on the charging surface 102.

The charging module 100 is usable to charge a variety of sizes and powers of batteries. For example, the battery can include a Lithium ion battery, a Lithium air battery, a Lithium metal battery, a Lithium sulfur battery, or a metal-air battery. The charging module 100 can also be used to charge multiple batteries or multiple tools at once In an embodiment, the charging module 100, in addition to being configured to transfer energy to charge the tool and/or battery, is further configured to transfer energy to charge at least one non-power tool device such as, for example, a battery tester, a vehicle diagnostic system, a wireless device, a wearable device, a mobile device, or a device for a vehicle.

Because the induction charging coil 103 enables wireless charging, the charging module 100 does not need a physical contact point for electrically connecting the battery/tool to the charging module. In conventional chargers, contact points can become obstructed by debris, or can be damaged such as by wear or impact, which can negatively impact the performance of the charger. Many types of contact points also require that the battery or tool is removably coupled to the charger, which necessitates a decoupling action before the battery/tool can be removed. By eliminating contact points, the charging module 100 not only removes the risk of debris or impact affecting the performance of charging a battery, but also enables maintaining a tool in an always-ready condition where the tool is easily removable from the charging module 100 without requiring any detachment or decoupling.

The charging surface 102 of the charging module 100 can be used as a resting surface on which the tool may be placed when not in active use. In an exemplary use case, a user performing a repetitive drilling operation iterates between operating a power drill with a rechargeable battery, and inserting a member into a hole resulting from the drilling operation. When using a conventional rechargeable drill, the battery is continually drained during operation, and continues to drain or at best holds steady when not in use. According to this disclosure, when inserting the member into the hole, the user can place the drill on the charging surface 102 of the charging module 100, and then the user can retrieve the drill for the subsequent drilling operation. In this way, the battery of the drill is at least partially recharged each time it is set aside while the user inserts a member. Because placing and removing the drill on the charging surface 102 does not require a coupling or uncoupling action, the drill can be placed and recovered without interruption to the user's workflow. Additionally, because the drill is charged whenever it is resting on the charging surface 102, the time over which the drill can be operated without stopping to recharge or replace the battery is extended relative to conventional charging systems.

In one embodiment, the charging module 100 further includes an electric plug (not shown) configured to connect the charging module 100 to an electrical power source, such as a wall socket, car power outlet, power converter, etc. In an embodiment, the charging module also includes a charging control unit (not shown) that is configured to operate the induction charging coil 103 to control a charging operation. Such a charging control unit can include a wireless communication device for communicating with, for example, a battery, a tool, a mobile device, or the like such as an RF antenna, near field communication (NFC), WiFi, Bluetooth, or the like. For example, the charging control unit can be configured to communicate with the battery and/or the tool to charge the battery based at least in part upon a charge level and/or state of the battery.

Figure 3:
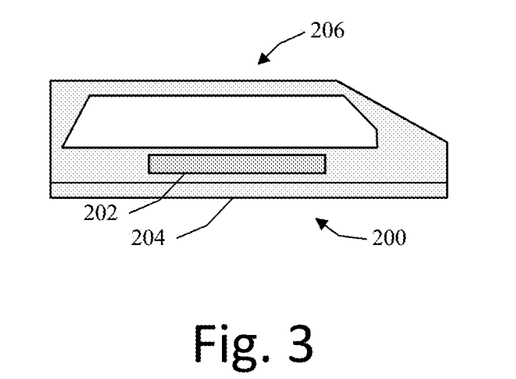
FIG. 3 is a side view of a docking frame according to this disclosure.
Figure 4:
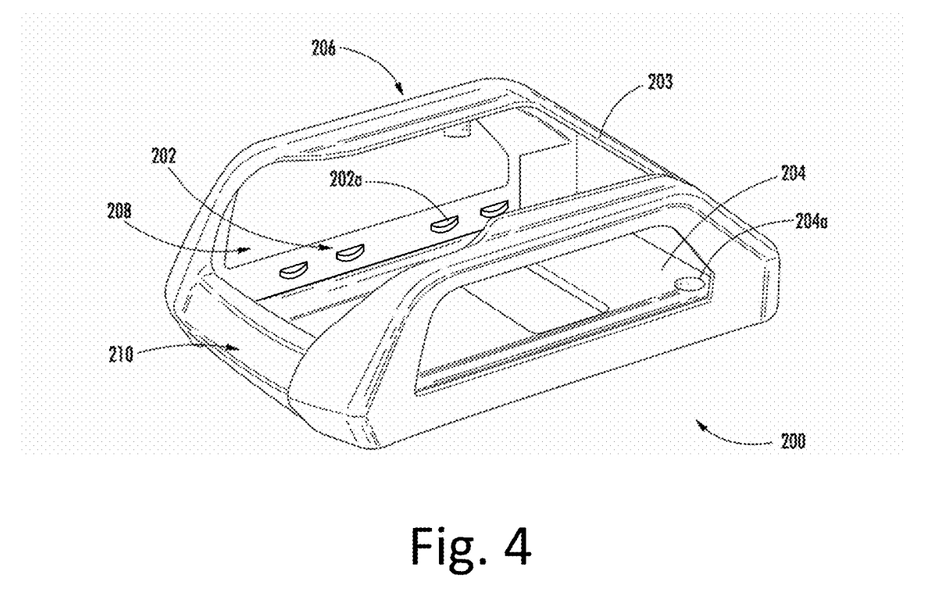
FIG. 4 is a perspective view of the docking frame of FIG. 3.

As discussed above, mounting the charging module 100 on another structure can be beneficial for securing the battery/tool during charging or between periods of use. FIG. 3 illustrates a cross section view and FIG. 4 illustrates a perspective view of an exemplary docking frame 200 for mounting the charging module 100 according to this disclosure. The docking frame 200 includes a receiving interface 202, an attachment surface 204, and a guiding structure 206, and also defines a receiving region 208 for receiving the charging module 100 and a stop surface 210 that together with the attachment surface 204 and the receiving interface 202 delimits the receiving region 208.

The attachment surface 204 forms a base of the docking frame 200. The receiving interface 202 extends away from the attachment surface 204 from the lateral sides thereof, whereby the receiving region 208 is the region between the lateral sides of the receiving interface 202. The receiving interface 202 is configured to removably receive the mounting interface 104 of the charging module 100 when the charging module 100 is received in the receiving region 208.

In this embodiment, the geometry of the mounting interface 104 and the receiving interface 202 are configured to engage with each other. As illustrated in FIG. 4, the receiving interface 202 includes a plurality of nubs 202a that fit into the sliding slot 106 (FIG. 1) of the mounting interface 104, although in other embodiments, the mounting interface 104 includes nubs and the receiving interface 202 includes a slot.

In another embodiment, the receiving interface 202 has a geometry that is at least partially complementary to geometry of the mounting interface 104 of the charging module 100. For example, one of the receiving interface 202 and the mounting interface 104 can include a protruding rib, and the other can include a rib-shaped recession configured to slidingly receive the rib. Other types of interfaces are also contemplated, including roller interfaces, and snap interfaces, as described in further detail below.

The receiving interface 202 can also include a stop member (not shown) configured to limit an extent to which the charging module 100 can be inserted into the docking frame 200. The stop member can include, for example, a ridge protrusion, a back-wall, a cross-member, and a ridge located the receiving interface 202 configured to delimit motion of the charging module 100 along the direction of the rail 106. In this embodiment, the stop surface 210 extends perpendicularly to the receiving interface 202 and delimits a front side of the receiving region 208 along the direction of the rail 106.

The attachment surface 204 is configured to be affixed to a rigid support, such as surface of a cart, a vehicle, a workbench, a table, a floor, a scaffold, or the like. The attachment surface 204 defines a plurality of holes 204a configured to receive a bolt, screw, clip, clamp, or other acceptable attachment member in order enable such attachment. When the docking frame 200 is affixed to a surface via the attachment surface 204, the docking frame 200 thus provides a secured mounting point for the charging module 100 that resists unintended motion.

Figure 5:
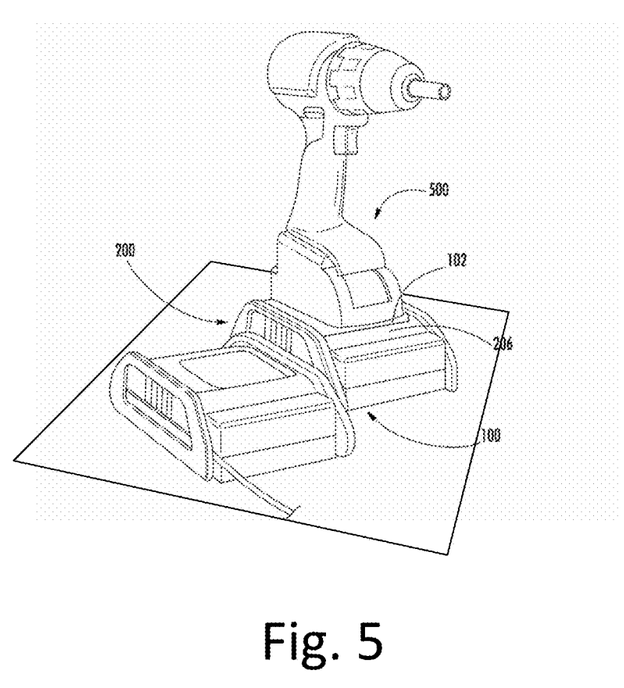
FIG. 5 is a perspective image of a tool with a removable battery resting on a charging surface of a charging module docked in a docking frame according to this disclosure.

FIG. 5 is a perspective image of a tool 500 resting on a chagrining surface 102 of a charging module 100 mounted in a docking frame 200. The guiding structure 206 is configured to guide the tool 500 onto a charging module 100 that is received by docking frame 200. The guiding structure 206 ensures that the devise is properly located for optimal charging of the battery by the charging module 100, and can also be configured to at least partially restrain the tool in the docking frame 200 in order to counteract unintended motion or vibration. In an embodiment, the guiding structure 206 has a geometry that is at least partially complementary to a geometry of the tool 500 such that, as the tool 500 is placed on the charging surface, the geometry of the guiding structure 206 engages the geometry of the tool to guide an optimal placement of the tool 500 on the charging surface 102.

Figure 6:
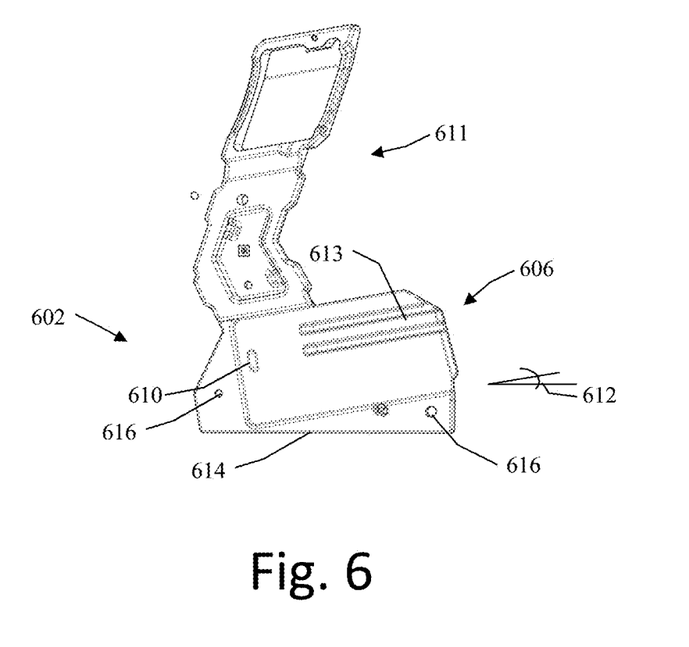
FIG. 6 is a side cross section view of an exemplary embodiment of a tool holder according to this disclosure.

Additional restraint of the tool may be desirable. For example, as illustrated in FIG. 5, while the guiding structure 206 ensures that a base of tool 500 is properly located, a remainder of the tool 500 may be susceptible to impacts or motion that can damage the tool 500 or tip the tool 500 out of position. FIG. 6 illustrates a side cross section view of an exemplary embodiment of a tool holder 602 that can be used to mount a charging module and/or a docking frame housing a charging module in order to provide additional support of a tool, as discussed below. The tool holder 602 includes a second receiving interface 606, a further stop member 610, and a tool holder portion 611, and defines an attachment surface 614 that forms a base of the tool holder 602.

The attachment surface 614 is configured to affix the tool holder 602 to a surface such as a desk, table, or the like, similarly to operation of the attachment surface 204 for affixing the docking frame 200 to such a surface. In this embodiment, the tool holder 602 further defines side attachment holes 616 on a surface perpendicular to the base 614 that are configured to mount the tool holder on a wall or side of a structure.

Figure 7:
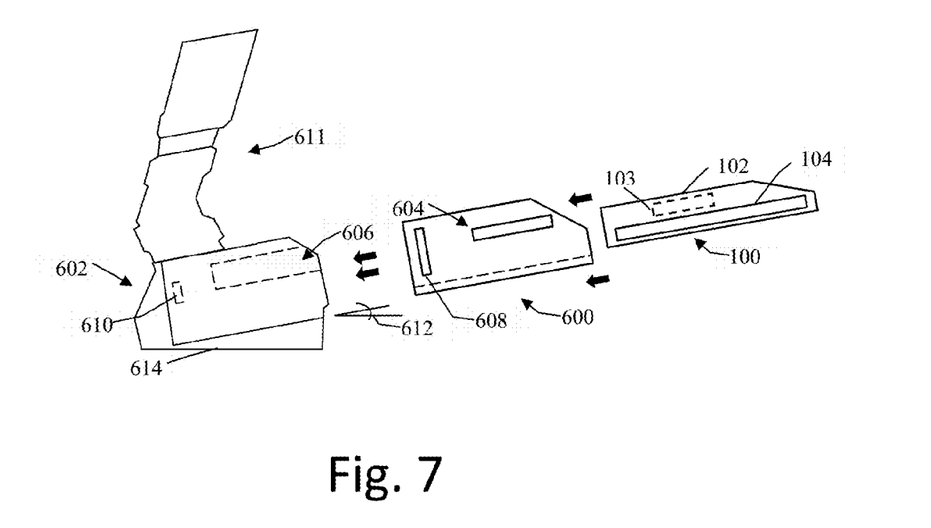
FIG. 7 is a side view of an exemplary embodiment of a wireless charging system according to this disclosure that includes the tool holder of FIG. 6.
Figure 8:
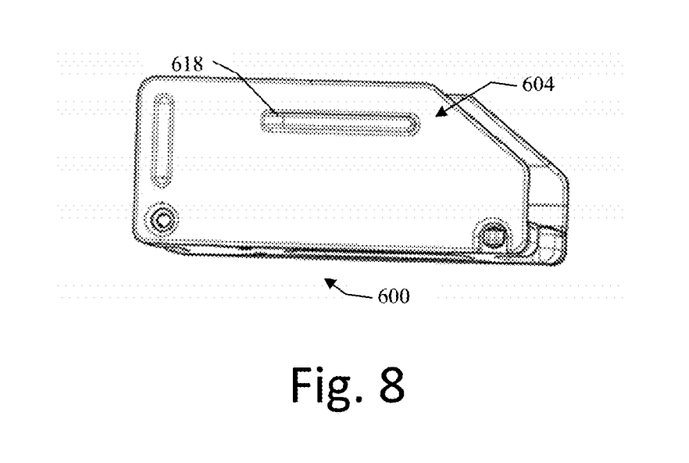
FIG. 8 is a perspective view of a docking frame of FIG. 7.

In one embodiment, illustrated in FIG. 7, the receiving interface 606 is configured to receive a docking frame 600, whereby the docking frame is configured to house the charging module 100. FIG. 8 illustrates a perspective view of the docking frame 600.

In addition to a receiving interface configured to receive a charging module (not shown), the docking frame 600 includes a second mounting interface 604, and an additional stop member 608. The second mounting interface 604 of the docking frame 600 is configured to engage with the second receiving interface 606 of the tool holder 602 in a manner similar to the engagement between the mounting interface 104 and receiving interface 202 of the charging module 100 and docking frame 200 (FIGS. 1 and 3). In this embodiment, the second mounting interface 604 includes a protruding rail 618 (FIG. 8) that is configured to be slidingly received in a slot 613 of the second receiving interface 606 (FIG. 6), but other types of mounting interfaces are also contemplated.

The second receiving interface 606 is oriented at an angle 612 relative to the base 614 of the tool holder 602 such that the side of the second receiving interface 606 facing away from the further stop member 610 is elevated compared to the opposite side of the second receiving interface 606. Due to the angle 612, the docking frame 600, when mounted via the second receiving interface 606, is urged by gravity to slide down along the second receiving interface 606 toward the tool holding portion 611. The further stop member 610 is configured to engage with the additional stop member 608 of the docking frame to delimit a range of motion of the docking frame 600 along the slot 613 into the tool holder 602.

Since the docking frame 600 is oriented at the angle 612, the charging surface 102 of the charging module 100 is also oriented at the angle 612 when the charging module 100 is mounted in the docking frame 600. In other words, the charging module 100 is oriented such that the charging surface 102 slopes downward toward the tool holding portion 611.

The tool holder portion 611 extends upwards from a region of the second receiving interface 606 proximate to the further stop member 610, and is configured to at least partially support the body of a tool disposed on the charging surface 102. Because the charging surface 102 is oriented at the angle 612, the tool is urged by gravity into the tool holder portion 611. The magnitude of the angle 612 is selected to enable a user to insert and remove the tool from the tool holder portion 602 via a swiping motion that results in a bottom surface of the tool sliding against the charging surface 102 so as to clear any debris disposed thereon. The tool holder 611 thus acts as a transverse support for a device resting on the sloped charging surface 102.

Figure 9:
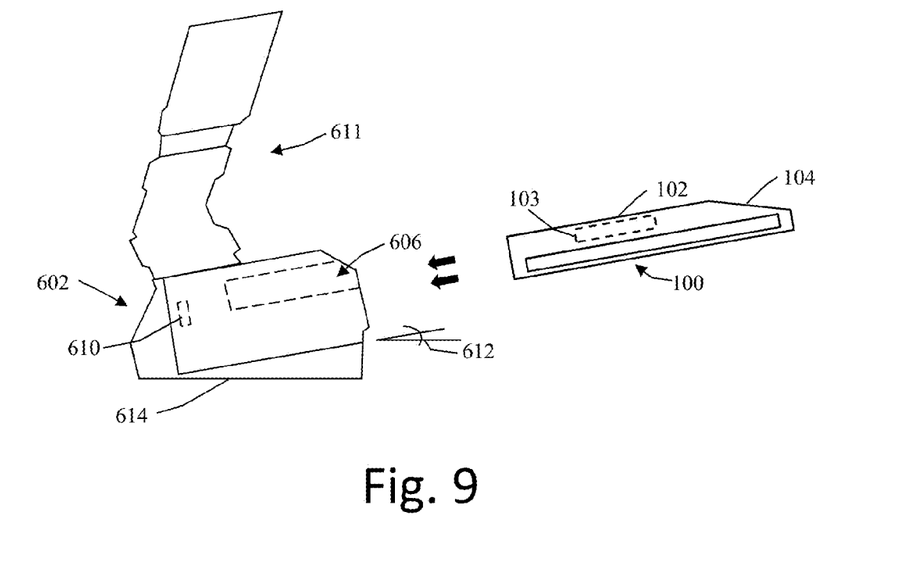
FIG. 9 is a side view of another exemplary embodiment of a wireless charging system according to this disclosure that includes the tool holder of FIG. 6.

In another embodiment, illustrated in FIG. 9, the charging module 100 is mounted directly in the tool holder 602, whereby the second receiving interface 606 is configured to engage directly with the mounting interface 104 of the charging module 100, and the docking frame 600 can be dispensed with. In this embodiment, the further stop element 610 of the tool holder 602 engages with an end surface of the charging module 100. By incorporating or dispensing with the docking frame 600, the tool holder can be selectively configured to accommodate a variety of different charging modules and tools with different dimensions and other attributes.

In a further embodiment, the docking frame 600 and/or the tool holder 602 includes a cord guide (not shown) configured to guide a power cord out from the charging module, through the docking frame 600 and/or tool holder 602, such that the power cord to be connected to a power source is unobstructed by the docking frame 600 and/or tool holder 602.

Figure 10:
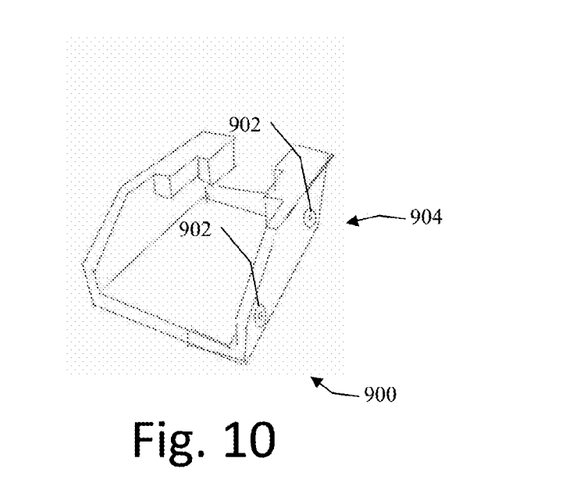
FIG. 10 is a perspective view of an exemplary embodiment of a docking frame with a couple roller interface according to this disclosure.
Figure 11:
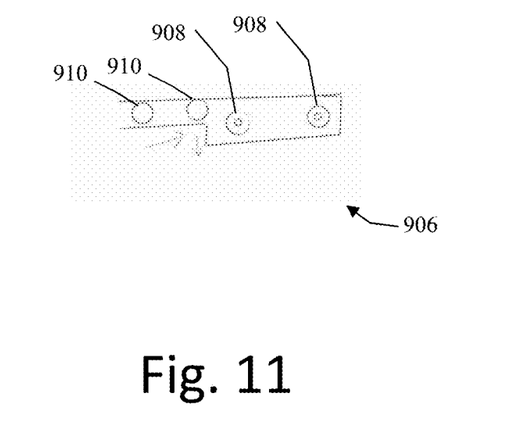
FIG. 11 is a side view of an exemplary embodiment of a couple roller-type interface for a tool holder according to this disclosure.

In addition to the nubs-and-slot and rib-and-slot interfaces discussed above, other types of interfaces between charging modules, docking frames, and tool holders are also contemplated. FIG. 10 illustrates a perspective view of an exemplary docking frame 900 having a second mounting interface 904 that includes couple rollers 902, and FIG. 11 is a side view of an exemplary receiving interface 906 of a tool holder that includes couple rollers 908 configured to engage the couple rollers 902 of the docking frame. The couple rollers 902 and 908 are configured to operate in a similar fashion to drawer slides with rollers.

The receiving interface 906 further includes stop members 910 configured such that the docking frame 900 can be slid and dropped into the receiving interface 906 with a single motion, but that removing the docking frame 900 from the tool holder requires both a lifting and pulling motion. An acceptable draw slider assembly is described in U.S. Pat. No. 2,860,929, the disclosure of which is incorporated in its entirety. Other conventional drawer slider assemblies are also contemplated. While FIGS. 10 and 11 illustrate a drawer slider assembly as applied to the second mounting interface 904 and the second receiving interface 906, it should be understood that a similar drawer slider interface can also be applied to the mounting interface of the charging module and the receiving interface of a docking frame.

Figure 12:
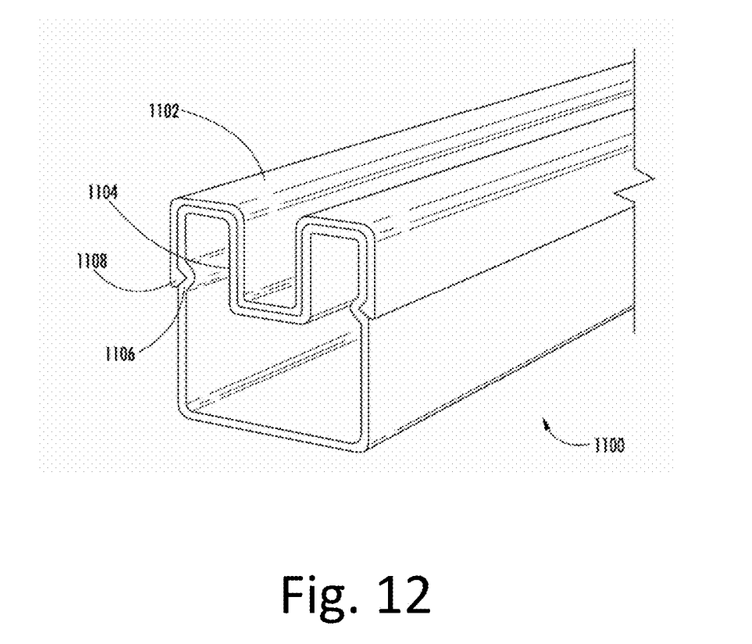
FIG. 12 is a perspective view of a snap-type interface according to this disclosure.

FIG. 12 illustrates a perspective view of an exemplary snap fit interface 1100 that can be used between a charging module, docking frame, and/or tool holder according to this disclosure. As illustrated in FIG. 12, the interface is formed between a mounting surface 1102 and a receiving surface 1104 configured to receive the mounting surface 1102. The receiving surface 1104 defines at least one snap receptacle 1106. The mounting surface 1102 has a complementary geometry to the geometry of the receiving surface 1104, and defines at least one a snap member 1108 configured to have a snap fit with the at least one snap receptacle 1106 when the mounting surface 1102 is mounted onto the receiving surface 1104.

In one embodiment according to this disclosure, a snap interface 1100 is incorporated into the docking frame 600 and tool holder 602 (FIG. 7). The additional stop member 608 and further stop member 610 are each configured to include one of the mounting surface 1102 and receiving surface 1104. When the docking frame 600 is inserted into the tool holder 602, the docking frame 600 may be removably snap coupled to the tool holder 602 via a snap-fitting the additional stop member 608 and further stop member 610 together.

In another embodiment, a snap interface 1100 is incorporated into the charging module 100 and docking frame 200 (FIGS. 1 and 3). Each of the bottom surface of the charging module and the attachment surface 204 facing the receiving region 208 is configured to include one of the mounting surface 1102 and the receiving surface 1104. When the charging module 100 is inserted into the receiving region, the charging module 100 may be removable snap-fitted to the attachment surface 204 by snap-fitting the bottom of the charging module 100 with the attachment surface 204. Similarly, a bottom surface of the docking frame 600 and an inside surface of the tool holder 602 can each be configured to include one of the mounting surface 1102 and receiving surface 1104.

The snap fit interface 1100 can replace the engagement between the mounting and receiving interfaces of the charging module, docking frame, and tool holder, or can be used to along with such mountings.

It is contemplated that different tool holders and docking frames may be configured to be used with different tools, and so to may different charging modules be configured to be used with different batteries and with different docking stations. Thus, in a further embodiment, a plurality of different tool holders are configured to be used with different docking frames and charging modules of different sizes and powers via common interfaces.

In an example, a first docking frame is mounted within a tool holder, and houses a first charging module. The first tool holder and the first charging module are configured to work with a first tool. When a second tool is desirably charged, the first docking frame is removed from the tool holder, and a second docking frame housing a second charging module is inserted therein, wherein the second charging module is configured to charge the second tool, and wherein the second docking frame has a mounting interface configured to engage with the receiving interface of the tool holder. In other words, tool holders, docking frames, and charging modules may be mixed and matched as desired due to common mounting and receiving interfaces.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A wireless charging system, comprising:
   a charging module that includes:
      a charging surface;
      a first mounting interface disposed on lateral sides of the charging module; and
      an inductive charging device configured to wirelessly charge a device disposed on the charging surface; and
   a tool holder that includes:
      a base surface;
      a holding portion configured to at least partially support the device; and
      a first receiving interface configured to receive the first mounting interface of the charging module at a fixed orientation relative to the base surface so as to mount the charging module in the tool holder such that the charging surface is oriented at a fixed angle relative to the base surface and slopes downward toward the holding portion, and such that the holding portion is configured to act as a transverse support for the device resting on the sloped charging surface.

2. The system of claim 1, further comprising:
   a first stop element configured to delimit a range of motion of the charging module along the first receiving region toward the holding portion.

3. The system of claim 1, wherein:
   the first receiving interface includes one of a protrusion and a recession configured to slidingly receive the protrusion; and
   the first mounting interface includes the other of the protrusion and the recession.

4. The system of claim 1, wherein the base surface of the tool holder defines an attachment surface configured to be affixed to a rigid member such that the wireless charging system is mounted on the rigid member.

5. The system of claim 1, wherein the angle between the base surface and the first receiving interface enables the device to be inserted and removed from the tool holder via a single swiping motion such that a bottom surface of the device slides against the charging surface of the charging module to clear debris disposed thereon.

6. The system of claim 1, wherein a surface of the tool holder perpendicular to the base surface defines an attachment surface configured to fixedly attach to a rigid and substantially vertical surface of an object such that the wireless charging system is mounted on the object.

7. The system of claim 1, wherein the tool holding portion is configured to hold the device at an optimal wireless charging location relative to the inductive charging device.

8. A wireless charging system, comprising:
   a charging module that includes:
      a charging surface;
      a first mounting interface disposed on lateral sides of the charging module; and
      an inductive charging device configured to wirelessly charge a device disposed on the charging surface;
   a docking frame that includes:
      a base surface
      a first receiving interface configured to receive the first mounting interface of the charging module to mount the charging module in the docking frame;
      a second mounting interface; and
      a guide member that is configured to guide the device to an optimal charging location relative to the inductive charging device; and
   a tool holder that includes:
      a further base surface;
      a holding portion configured to at least partially support the device; and
      a second receiving interface oriented at an angle relative to the further base surface and configured to receive the second mounting interface of the docking frame such that the charging surface is oriented at the angle relative to the base surface and slopes downward toward the holding portion, and such that the holding portion is configured to act as a transverse support for the device resting on the sloped charging surface.

9. The system of claim 8, wherein:
   the second receiving interface has a first stop element; and
   the second mounting interface has a second stop element configured to engage with the first stop element and delimit a range of motion of the docking frame in the second receiving interface toward the holding portion.

10. The system of claim 9, wherein
the first stop member includes one of a snap member and a snap receptacle configured to receive the snap member via a snap fit; and
the second stop member include the other of the snap member and the snap receptacle such that the docking frame is configured to be removably snap fitted to the tool holder.

11. The system of claim 8, wherein:
the second receiving interface includes one of a protrusion and a recession configured to slidingly receive the protrusion; and
the second mounting interface includes the other of the protrusion and the recession.

12. The system of claim 8, wherein:
the second receiving interface includes at least one first couple roller; and
the second mounting interface includes at least one second couple roller configured to engage with the at least one fist couple roller such that the docking frame is slidingly mounted within the second receiving interface.

13. The system of claim 8, further comprising:
at least one additional charging module, additional docking frame, or additional tool holder having at least one different dimension than the charging module, docking frame, or tool holder respectively,
wherein the at least one additional charging module, additional docking frame, or additional tool holder includes at least one interface that is compatible with an interface of the charging module, docking frame, or tool holder respectively such that the charging module, docking frame, or tool holder can be substituted for the at least one additional charging module, additional docking frame, or additional tool holder respectively.

14. The system of claim 8, wherein the further base surface defines an attachment surface configured to be affixed to a rigid support member.

15. The system of claim 8, wherein a surface of the tool holder perpendicular to the further base surface defines an attachment surface configured to affixed to a rigid and substantially vertical surface.

16. The holder of claim 9, wherein the tool holding portion is configured to hold the device at an optimal wireless charging location relative to the inductive charging device.

17. The system of claim 8, wherein the base surface defines an attachment surface configured to be affixed to a rigid support member such that the wireless charging system is mounted on the rigid member.

* * * * *

UNITED STATES PATENT AND TRADEMARK OFFICE
CERTIFICATE OF CORRECTION

PATENT NO. : 9,793,744 B2
APPLICATION NO. : 14/851314
DATED : October 17, 2017
INVENTOR(S) : Zhang et al.

It is certified that error appears in the above-identified patent and that said Letters Patent is hereby corrected as shown below:

In the Claims

In Column 11, Lines 20-24, Lines 4-8 of Claim 12 should read:
the second mounting interface includes at least one second couple roller configured to engage with the at least one first couple roller such that the docking frame is slidingly mounted within the second receiving interface.

Signed and Sealed this
First Day of May, 2018

Andrei Iancu
*Director of the United States Patent and Trademark Office*